United States Patent
Stevenson et al.

(10) Patent No.: US 11,173,668 B2
(45) Date of Patent: Nov. 16, 2021

(54) METHODS AND RAIL SUPPORTS FOR ADDITIVE MANUFACTURING

(71) Applicant: General Electric Company, Schenectady, NY (US)

(72) Inventors: Christian Xavier Stevenson, Cincinnati, OH (US); Patrick Michael Kenney, Cincinnati, OH (US); John William Moores, West Chester, OH (US); David Corsmeier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 10 days.

(21) Appl. No.: 16/734,485

(22) Filed: Jan. 6, 2020

(65) Prior Publication Data

US 2020/0139635 A1     May 7, 2020

Related U.S. Application Data

(62) Division of application No. 15/153,445, filed on May 12, 2016, now Pat. No. 10,556,383.

(51) Int. Cl.
*B29C 64/40*     (2017.01)
*B33Y 10/00*     (2015.01)
(Continued)

(52) U.S. Cl.
CPC .............. *B29C 64/40* (2017.08); *B29C 64/10* (2017.08); *B29C 64/153* (2017.08); *B33Y 10/00* (2014.12); *B23K 26/354* (2015.10); *B29C 64/135* (2017.08)

(58) Field of Classification Search
CPC ..... B29C 64/10; B29C 64/135; B29C 64/141; B29C 64/153; B29C 64/245;
(Continued)

(56) References Cited

U.S. PATENT DOCUMENTS

| 4,863,538 A | 9/1989 | Deckard |
| 5,460,758 A | 10/1995 | Langer et al. |

(Continued)

FOREIGN PATENT DOCUMENTS

| DE | 102016200043 A1 | 7/2017 |
| GB | 2458745 A | 10/2009 |

(Continued)

OTHER PUBLICATIONS

Japanese office action for application 2017-011743 dated Feb. 2, 2021 (6 pages with English translation).

*Primary Examiner* — Robert C Dye
*Assistant Examiner* — Sedef E Paquette
(74) *Attorney, Agent, or Firm* — Dinsmore & Shohl LLP

(57) ABSTRACT

The present disclosure generally relates to methods for additive manufacturing (AM) that utilize rail support structures in the process of building objects, as well as novel rail support structures to be used within these AM processes. The rail support structures include a plurality of substantially parallel vertical walls, each wall extending substantially parallel to a direction from the first side to the second side. Adjacent walls of the plurality of substantially parallel vertical walls are separated by a portion of unfused powder. An object is formed above the plurality of substantially parallel vertical walls.

12 Claims, 6 Drawing Sheets

(51) Int. Cl.
    *B29C 64/10*     (2017.01)
    *B29C 64/153*     (2017.01)
    *B29C 64/135*     (2017.01)
    *B23K 26/354*     (2014.01)

(58) Field of Classification Search
    CPC ..... B29C 64/277; B29C 64/282; B29C 64/40; B23K 26/0622; B23K 26/354; B33Y 10/00; B33Y 30/00
    USPC .................................................. 264/412, 497
    See application file for complete search history.

(56) References Cited

U.S. PATENT DOCUMENTS

| | | | |
|---|---|---|---|
| 5,529,471 | A | 6/1996 | Khoshevis |
| 5,837,960 | A | 11/1998 | Lewis et al. |
| 6,193,923 | B1 | 2/2001 | Leyden et al. |
| 6,471,800 | B2 | 10/2002 | Jang et al. |
| 6,995,334 | B1 | 2/2006 | Kovacevic et al. |
| 8,506,836 | B2 | 8/2013 | Szuromi et al. |
| 2001/0003004 | A1 | 6/2001 | Leyden et al. |
| 2010/0042241 | A1 | 2/2010 | Inoue |
| 2014/0251481 | A1 | 9/2014 | Kroll et al. |
| 2014/0335313 | A1 | 11/2014 | Chou et al. |
| 2015/0021379 | A1 | 1/2015 | Albrecht et al. |
| 2017/0113413 | A1* | 4/2017 | Iwase .................. B29C 64/386 |
| 2018/0370146 | A1 | 12/2018 | Domrose et al. |

FOREIGN PATENT DOCUMENTS

| | | |
|---|---|---|
| JP | 2002322501 A | 11/2002 |
| JP | 2003225948 A | 8/2003 |
| JP | 2006183146 A | 7/2006 |
| JP | 2011256434 A | 12/2011 |
| JP | 2013194263 A | 9/2013 |
| JP | 2015134411 A | 7/2015 |
| JP | 2015174427 A | 10/2015 |
| WO | WO2017/096050 1 | 6/2017 |

* cited by examiner

US 11,173,668 B2

METHODS AND RAIL SUPPORTS FOR ADDITIVE MANUFACTURING

CROSS REFERENCE TO RELATED APPLICATIONS

This Application claims priority to, and is a divisional application of, U.S. patent application Ser. No. 15/153,445 filed May 12, 2016 which is incorporated by reference in its entirety herein.

INTRODUCTION

The present disclosure generally relates to methods for additive manufacturing (AM) that utilize support structures in the process of building objects, as well as novel support structures to be used within these AM processes.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is schematic diagram showing a cross-sectional view of an exemplary conventional system 100 for direct metal laser sintering (DMLS) or direct metal laser melting (DMLM). The apparatus 100 builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 travelling in direction 134 to maintain the powder at a level 118 and remove excess powder material extending above the powder level 118 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of access powder by, for example, blowing or vacuuming. Other post processing procedures include a stress release process. Additionally, thermal and chemical post processing procedures can be used to finish the part 122.

The apparatus 100 is controlled by a computer executing a control program. For example, the apparatus 100 includes a processor (e.g., a microprocessor) executing firmware, an operating system, or other software that provides an interface between the apparatus 100 and an operator. The computer receives, as input, a three dimensional model of the object to be formed. For example, the three dimensional model is generated using a computer aided design (CAD) program. The computer analyzes the model and proposes a tool path for each object within the model. The operator may define or adjust various parameters of the scan pattern such as power, speed, and spacing, but generally does not program the tool path directly.

FIG. 2 illustrates a plan view of a conventional support structure 220 used to vertically support a portion of an object 210. The support structure 220 is a matrix support including cross hatching (e.g., scan lines) forming a series of perpendicular vertical walls. The area between the platform 114 and an overhanging portion of the object may be filled with such matrix support, which may provide a low density structure for supporting the overhanging portion as it is built. In an aspect, a matrix support may be automatically generated for an object to support any bottom surface of the object that is not connected to the platform 114. For example, the MAGICS™ software from Materialise NV may generate matrix supports for the object within a CAD model.

The present inventors have discovered that as the additive manufacturing process described above is adapted to larger dimensioned parts, difficulties arise for matrix supports. For example, as the size of the additive manufacturing apparatus is increased to accommodate larger builds, lateral forces exerted by the recoater arm on the object and supports also increases. For example, the recoater arm 116 may directly contact the support if warping has occurred due to uneven thermal dissipation. Additionally, as the recoater arm pushes powder, the powder may exert lateral forces on the matrix support. Because the matrix supports include perpendicular walls, there is always a surface of the support that is oriented transverse to the recoater direction. The cells formed by the matrix support may retain powder such that the lateral forces are applied to the matrix support through the powder. Such transverse surfaces are prone to tipping, bending, or other deformations due to the lateral forces exerted by the recoater arm 116.

In view of the above, it can be appreciated that there are problems, shortcomings or disadvantages associated with AM techniques, and that it would be desirable if improved methods of supporting objects and support structures were available.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides a method for fabricating an object. The method includes: (a) irradiating a layer of powder in a powder bed with an energy beam in a series of scan lines to form a fused region; (b) providing a subsequent layer of powder over the powder bed by passing a recoater arm over the powder bed from a first side of the powder bed to a second side of the powder bed; and (c) repeating steps (a) and (b) until the object and at least one support structure is formed in the powder bed. The at least one support structure includes a plurality of substantially parallel vertical walls, each wall extending substantially parallel to a direction from the first side to the second side. Adjacent walls of the plurality of substantially parallel vertical walls are separated by a portion of unfused powder. The object is formed above the plurality of substantially parallel vertical walls.

In another aspect, the disclosure provides a method of fabricating an object based on a three dimensional computer model including the object and a solid support structure under the object. The method uses a manufacturing apparatus including a powder bed, energy beam, and a recoater arm. The method includes scanning multiple scan lines of the solid support in the powder bed in a single direction substantially parallel to a direction of movement of the recoater arm using a beam width less than a spacing between adjacent scan lines. The method also includes scanning multiple scan lines of the object above the support structure using a beam width greater than the spacing between adjacent scan lines.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Figure 3:
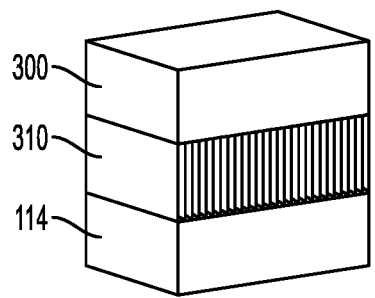
FIG. 3 illustrates a perspective view of an example of a rectangular prism object supported by a support structure including rail supports in accordance with aspects of the present disclosure.
Figure 4:
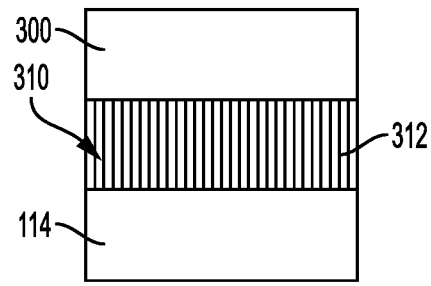
FIG. 4 illustrates a front view of the rectangular prism object and example support structure in FIG. 3.
Figure 5:
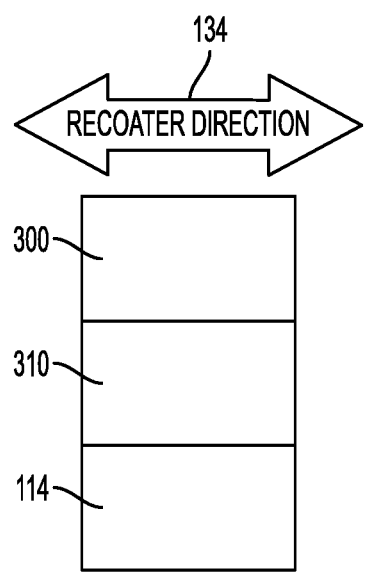
FIG. 5 illustrates side view of the rectangular prism object and example support structure in FIG. 3.

FIGS. 3-5 illustrate an example of a rectangular prism object 300 supported by a support structure 310 in accordance with aspects of the present invention. FIG. 3 is a perspective view of the rectangular prism object 300 and the support structure 310. FIG. 4 is a front view of the rectangular prism object 300 and the support structure 310. FIG. 5 is an end view of the rectangular prism object 300 and the support structure 310.

Figure 1:
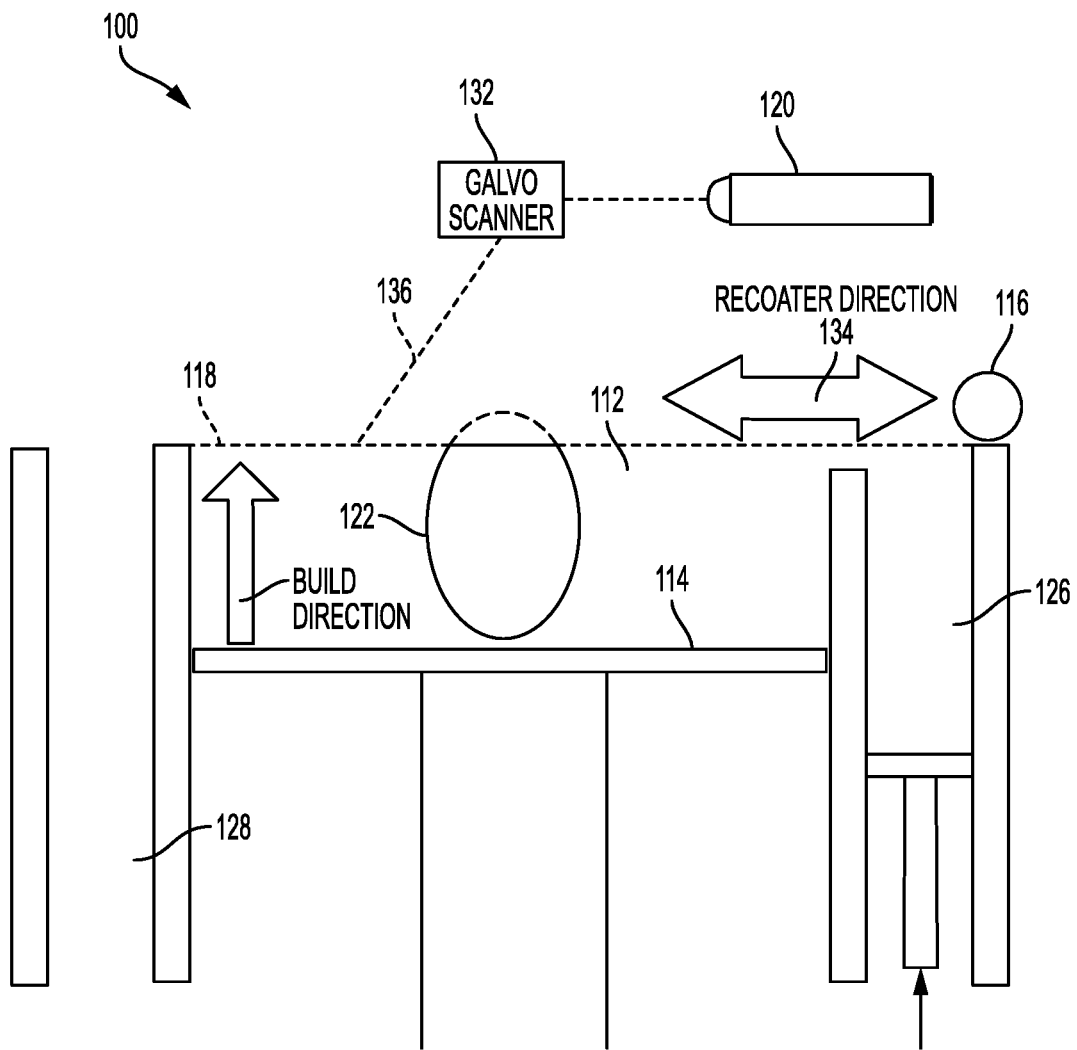
FIG. 1 is schematic diagram showing an example of a conventional apparatus for additive manufacturing.
Figure 2:
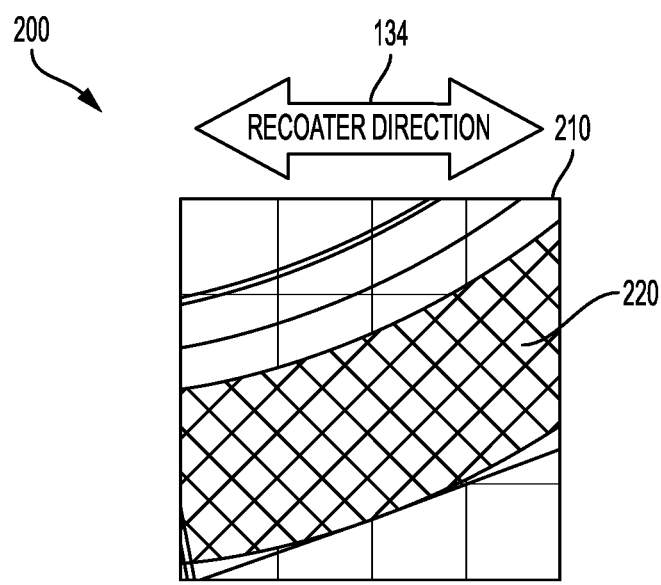
FIG. 2 illustrates a plan view of an example object and a conventional matrix support.

The rectangular prism object 300 and the support structure 310 may be manufactured according to an AM process. For example, the apparatus 100 of FIG. 1 and method described above may be used. In this type of AM process, the object 300 is built layer-by-layer by selectively sintering or melting areas of the powder in the regions that form the object 300. The support structure 310 is built simultaneously with the object 300 by melting or sintering additional regions of the powder in the location of the support structure 310.

Upon completion of the AM process, the support structure 310 is removed from the object 300. In one aspect, the support structure 310 is attached along with the object to the build plate and may be detached from the build plate and discarded. The support structure 310 may alternatively be formed without attachment to the build plate as a free standing object within the powder bed. For example, the support structure 310 may be formed on top of a first portion of an object in order to support an overhanging second portion of the object. In addition, the support structure 310 may be attached to the object 300 along each of the rails 312, which may be readily broken away once the AM process is complete. This may be accomplished by providing a breakaway structure—a small tab of metal joining the object 300 and support structure 310. The breakaway structure may also resemble a perforation with several portions of metal joining the object 300 and support structure 310.

The removal of the support structure 310 from the object 300 may take place immediately upon, or during, removal of the object from the powder bed. Alternatively, the support structure may be removed after any one of the post-treatment steps. For example, the object 300 and support structure 310 may be subjected to a post-anneal treatment and/or chemical treatment and then subsequently removed from the object 300 and/or build plate.

The present inventors have found that certain objects may benefit from a support structure 310 that includes vertical walls or rails oriented in a direction substantially parallel to the recoater direction 134. In the example aspect illustrated in FIGS. 3-5, the rectangular prism object 300 is separated from the build plate 114. The object 300 may be, for example, a tab protruding from a larger object.

The object 300 is generally a solid object or includes solid portions. The apparatus 100 forms the object 300 by melting a series of overlapping scan lines in each layer of the object 300. That is, when forming a layer of the object 300, the galvo scanner scans a series of parallel scan lines with the energy beam to melt the powder in a region of the powder bed corresponding to the location of the object in the layer. The width of the energy beam is set wider than the distance between the scan lines so that the melt pool formed by each scan line fuses with the adjacent scan line to form a solid layer. The beam width may be controlled directly, or may be set by adjusting a power of the energy beam or a movement speed of the galvo scanner. The apparatus 100 changes the orientation of the scan lines in successive layers in order to provide uniform fusing. For example, rotating the orientation of the scan lines in successive layers helps prevent structural weaknesses from developing within the solid object 300.

The support structure 310 is a support structure including a plurality of rails 312. Each rail 312 is a vertical wall oriented in a direction substantially parallel to the recoater direction 134. The angle formed between each rail and the recoater direction 134 is less than 30 degrees, preferably less than 10 degrees, and more preferably less than 5 degrees. In one embodiment, the orientation of the rails is aligned with the recoater direction 134 such that the orientation of the rails is parallel to the recoater direction 134. Although the rails 312 are illustrated as aligned with the sides of the object 300, in an aspect, the orientation of the rails 312 is independent of the shape and orientation of the object 300. Each rail 312 extends vertically from the build plate 114 to a bottom surface of the object 300. The adjacent rails 312 are separated by a continuous portion of unfused powder. In an aspect, the portion of unfused powder has a minimum width sufficient to prevent the adjacent rails 312 from fusing together. In an aspect, the minimum width separating the adjacent rails 312 is based on thermal properties of the powder. The minimum width is sufficient to prevent the unfused powder from sintering due to heat from the rails 312. In an aspect, the minimum width is between 0.1 millimeters to 10 millimeters, preferably approximately 1 millimeter. In an aspect, there are no fused portions connecting adjacent rails 312.

The rails 312 are formed layer by layer by fusing a line of powder at the same location in each subsequent layer. As the recoater 116 provides a subsequent layer of powder on top of the newly fused top layer of the rails 312, the recoater 116 moves in a direction substantially parallel to each of the rails 312. In an aspect, the thickness of a subsequent layer may be in the range of approximately 20 microns to approximately 50 microns. Due to warping or other thermal expansion or contraction, it is possible for recoater 116 to contact the rails 312. Due to the substantially parallel orientation of the rails with respect to the movement of the recoater 116, even if recoater 116 contacts the rails 312, the recoater 116 will generally ride on top of the rails 312 rather than exerting lateral forces against the narrow dimension of the rails 312. Further, the portion of unfused powder between the rails 312 may move in response to lateral forces generated by movement of the powder as the recoater 116 provides the subsequent layer. For example, the portion of unfused powder may shift or compress in a direction parallel to the recoater direction 134. Because there are no surfaces of the rails 312 transverse to the recoater direction 134, the movement of the powder does not apply significant lateral forces to the support structure 310. Accordingly, the support structure 310 may be less likely to deform or tip over, which could result in a failed build or a defective object 300.

In an aspect, the apparatus 100 forms the support structure 310 based on a three dimensional computer model including an individual object for each rail 312. Using a CAD program, the operator modifies a three dimensional model of the object to include the additional objects for each rail. The operator may use software to generate multiple objects within the three dimensional model. The three dimensional model is then provided to the apparatus 100. The apparatus 100 forms each rail 312 as a separate solid object. Each rail 312 may be formed by a single scan line.

In another aspect, the support structure 310 is defined as a single solid object within the three dimensional model. For example, the operator uses the CAD program to extrude the object 300 downward. An extrude function is typically available in the CAD program. The extrude function determines the coordinates of the edges of a bottom surface of the object and generates a second object extending downward from the object to a point such as another solid object or the bottom of the model (e.g., the build plate) as designated by the operator. For example, for the object 300, the coordinates of the edges of the bottom surface are defined by the four corners. Accordingly, the extruded object corresponding to the support structure 310 is also a rectangular prism. In the three dimensional model, the support structure 310 is a solid object. When the three dimensional model is provided to the apparatus 100, the operator sets the scan parameters for the support structure 310 such that the rails 312 are formed instead of a solid block. Each rail 312 is formed by a single scan line. A width of the energy beam is set to be less than a distance between center lines of the rails 312. The spacing between scan lines is set equal to the distance between the center lines of the rails 312. Additionally, a constant direction for the scan lines is set for the support structure 310. The constant direction is substantially parallel to the recoater direction 134. The scan lines may be formed as the galvo scanner 132 scans either forward or backward along the recoater direction 134. The constant direction does not change between layers, so the scan lines in each subsequent layer are aligned with the scan lines in the layer below to form the rails 312.

Figure 6:
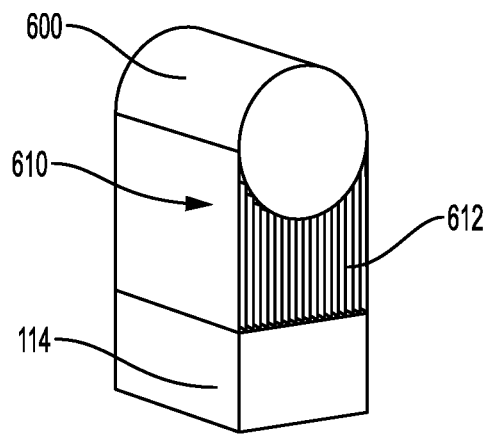
FIG. 6 illustrates a perspective view of an example of a cylindrical object supported by a support structure in accordance with aspects of the present invention.
Figure 7:
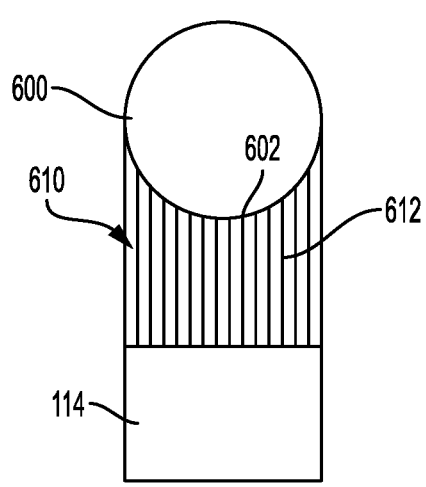
FIG. 7 illustrates a front view of the cylindrical object and example support structure in FIG. 6.
Figure 8:
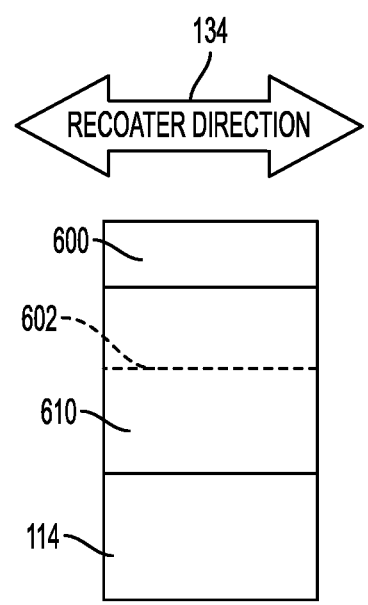
FIG. 8 illustrates side view of the cylindrical object and example support structure in FIG. 6.
Figure 9:
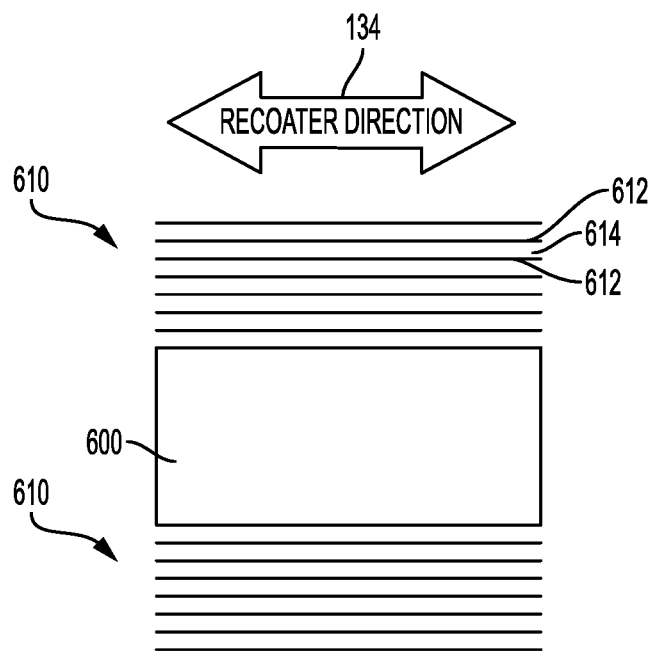
FIG. 9 illustrates horizontal cross-sectional view of the cylindrical object and example support structure in FIG. 6.

FIGS. 6-9 illustrate an example of a cylindrical object 600 supported by a support structure 610 in accordance with aspects of the present invention. FIG. 6 is a perspective view of the cylindrical object 600 and the support structure 610. FIG. 7 is a front view of the cylindrical object 600 and the support structure 610. FIG. 8 is an end view of the cylindrical object 600 and the support structure 610. FIG. 9 is a horizontal cross sectional view of the cylindrical object 600 and the support structure 610.

Similar to the object 300 discussed above, The object 600 is a solid object formed by melting a series of overlapping scan lines in each layer. The apparatus 100 changes the orientation of the scan lines in successive layers in order to provide uniform fusing. The support structure 610 is a support structure including a plurality of rails 612. Each rail 612 is a vertical wall oriented in a direction parallel to the recoater direction 134. The rails 612 may have similar spacing to the rails 312 discussed above.

The apparatus 100 may also form the rails 612 based on a three dimensional model. Generating individual rails 612 with a CAD program may be tedious because each rail 612 has a different height corresponding to the bottom surface of the object 600. The rails 612 may also be generated by extruding the object 600 downward. Because the object 600 does not have a flat bottom surface, the object 600 may be extruded downward from its widest point. Accordingly, the coordinates forming the edges of the extruded object are based on the sides and ends of the cylindrical object 600. The extruded object has a rectangular horizontal cross section, but the vertical cross section has a concave upward top surface corresponding to the bottom surface 602 of the object 600. When the three dimensional model of the object 600 and the extruded object is provided to the apparatus 100, the operator sets the scan parameters for the support structure 610 such that the rails 612 are formed instead of a solid block. Each rail 612 is formed by a single scan line. A width of the energy beam is set to be less than a distance between center lines of the rails 612. The spacing between scan lines is set equal to the distance between the center lines of the rails 612. Additionally, a constant direction for the scan lines is set for the support structure 610. The constant direction is parallel to the recoater direction 134. The scan lines may be formed as the galvo scanner 132 scans either forward or backward along the recoater direction 134. The constant direction does not change between layers, so the scan lines in each subsequent layer are aligned with the scan lines in the layer below to form the rails 612.

As illustrated in FIG. 9, as the object 600 and the support structure 610 are being formed, a horizontal layer may include portions of both the object 600 and the support structure 610. The portion of the support structure 610 includes adjacent rails 612 separated by a portion of unfused powder 614. The galvo scanner 132 scans the portion of the object 600 with different scan parameters than the scan parameters used for the portion of the support structure 610. For example, the width of the scan lines for the object 600 is wider and the distance between scan lines is narrower such that the scan lines overlap to form a solid object. Additionally, the orientation of the scan lines may be changed within the layer or between layers to promote even melting. When the recoater 116 applies a subsequent layer of powder, the recoater travels in a direction substantially parallel to the rails 612 as well as traveling over the portion of the solid object 600.

Figure 10:
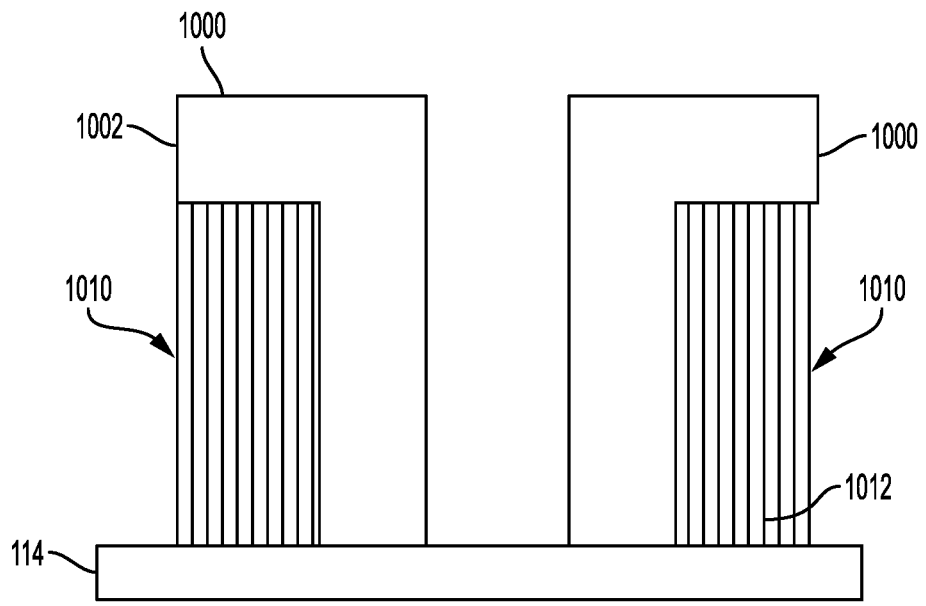
FIG. 10 illustrates a vertical cross-sectional view of another example object and support structure.
Figure 11:
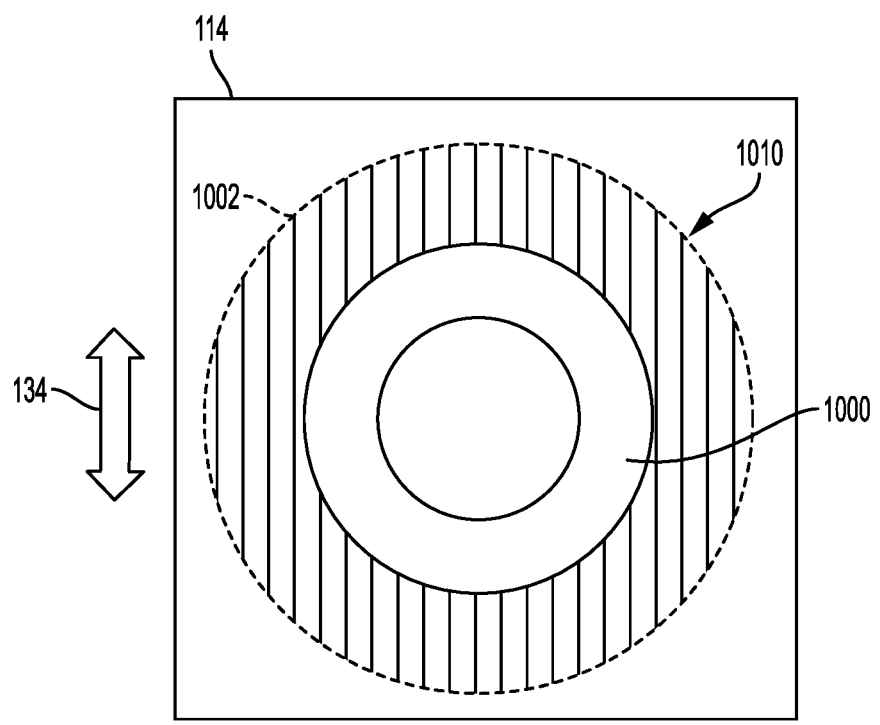
FIG. 11 illustrates a horizontal cross-sectional view of the object and support structure in FIG. 10.

FIGS. 10 and 11 illustrate yet another example object 1000 and a support structure 1010. FIG. 10 illustrates a vertical cross section of the object 1000 and the support structure 1010. FIG. 11 illustrates a horizontal cross section of the object 1000 and the support structure 1010. For FIG. 10, the recoater direction is into the page and for FIG. 11, the recoater direction 134 is illustrated.

The object 1000 is a cylindrical object having an external flange 1002 at one end. The object 1000 is oriented such that the axis of the cylindrical object is vertical and the flange 1002 is located at a top end. If no support structure were included, the flange 1002 would likely cause build errors because the relatively large bottom surface of the flange 1002 would be unsupported. As illustrated in FIG. 11, the object 1000 may be formed by overlapping scan lines oriented in different directions.

The support structure 1010 includes a plurality of rails 1012. As illustrated, each rail 1012 extends from the build plate 114 vertically to the bottom surface of the flange 1002. Within each horizontal layer, as illustrated in FIG. 11, each rail 1012 extends horizontally to occupy the space beneath the flange 1002. The support structure 1010 is a vertically oriented cylinder formed by a plurality of vertical rails oriented in a direction parallel to the recoater direction 134.

Moreover a method of fabricating an object may include consecutively, concurrently, or alternatingly, melting powder to form portions of multiple supports as described above. Additionally, for an object fabricated using multiple supports, the post-processing procedures may include removing each of the supports. In an aspect, a support structure may include multiple supports of different types as described herein. The multiple supports may be connected to each other directly, or via the object. The selection of supports for a specific object may be based on the factors described herein (e.g., shape, aspect ratios, orientation, thermal properties, etc.).

When it becomes necessary to remove the support structure 310/610/1010 from the object 300/600/1000, the operator may apply force to break the support structure free when contact surfaces are present. The support structure may be removed by mechanical procedures such as twisting, breaking, cutting, grinding, filing, or polishing. Additionally, thermal and chemical post processing procedures may be used to finish the object. The removal of the support structure 310/610/1010 from the object 300/600/1000 may take place immediately upon or during removal of the object from the powder bed. Alternatively, the support structure may be removed after any one of the post-treatment steps. For example, the object 300/600/1000 and support structure 310/610/1010 may be subjected to a post-anneal treatment and/or chemical treatment and then subsequently removed from the object 300/600/1000 and/or build plate.

In an aspect, multiple supports may be used in combination to support fabrication of an object, prevent movement of the object, and/or control thermal properties of the object. That is, fabricating an object using additive manufacturing may include use of one or more of: scaffolding, tie-down supports, break-away supports, lateral supports, conformal supports, connecting supports, surrounding supports, keyway supports, breakable supports, leading edge supports, or powder removal ports. The following patent applications include disclosure of these supports and methods of their use:

U.S. patent application Ser. No. 15/042,019, titled "METHOD AND CONFORMAL SUPPORTS FOR ADDITIVE MANUFACTURING", and filed Feb. 11, 2016;

U.S. patent application Ser. No. 15/042,024, titled "METHOD AND CONNECTING SUPPORTS FOR ADDITIVE MANUFACTURING", and filed Feb. 11, 2016;

U.S. patent application Ser. No. 15/041,973, titled "METHODS AND SURROUNDING SUPPORTS FOR ADDITIVE MANUFACTURING", and filed Feb. 11, 2016;

U.S. patent application Ser. No. 15/042,010, titled "METHODS AND KEYWAY SUPPORTS FOR ADDITIVE MANUFACTURING", and filed Feb. 11, 2016;

U.S. patent application Ser. No. 15/042,001, titled "METHODS AND BREAKABLE SUPPORTS FOR ADDITIVE MANUFACTURING", and filed Feb. 11, 2016;

U.S. patent application Ser. No. 15/041,991, titled "METHODS AND LEADING EDGE SUPPORTS FOR ADDITIVE MANUFACTURING", and filed Feb. 11, 2016; and U.S. patent application Ser. No. 15/041,980, titled "METHOD AND SUPPORTS WITH POWDER REMOVAL PORTS FOR ADDITIVE MANUFACTURING", and filed Feb. 11, 2016.

The disclosure of each of these applications are incorporated herein in their entirety to the extent they disclose additional support structures that can be used in conjunction with the support structures disclosed herein to make other objects.

Additionally, scaffolding includes supports that are built underneath an object to provide vertical support to the object. Scaffolding may be formed of interconnected supports, for example, in a honeycomb pattern. In an aspect, scaffolding may be solid or include solid portions. The scaffolding contacts the object at various locations providing load bearing support for the object to be constructed above the scaffolding. The contact between the support structure and the object also prevents lateral movement of the object.

Tie-down supports prevent a relatively thin flat object, or at least a first portion (e.g. first layer) of the object from moving during the build process. Relatively thin objects are prone to warping or peeling. For example, heat dissipation may cause a thin object to warp as it cools. As another example, the recoater may cause lateral forces to be applied to the object, which in some cases lifts an edge of the object. In an aspect, the tie-down supports are built beneath the object to tie the object down to an anchor surface. For example, tie-down supports may extend vertically from an anchor surface such as the platform to the object. The tie-down supports are built by melting the powder at a specific location in each layer beneath the object. The tie-down supports connect to both the platform and the object (e.g., at an edge of the object), preventing the object from warping or peeling. The tie-down supports may be removed from the object in a post-processing procedure.

A break-away support structure reduces the contact area between a support structure and the object. For example, a break-away support structure may include separate portions, each separated by a space. The spaces may reduce the total size of the break-away support structure and the amount of powder consumed in fabricating the break-away support structure. Further, one or more of the portions may have a reduced contact surface with the object. For example, a portion of the support structure may have a pointed contact surface that is easier to remove from the object during post-processing. For example, the portion with the pointed contact surface will break away from the object at the pointed contact surface. The pointed contact surface stills provides the functions of providing load bearing support and tying the object down to prevent warping or peeling.

Lateral support structures are used to support a vertical object. The object may have a relatively high height to width aspect ratio (e.g., greater than 1). That is, the height of the object is many times larger than its width. The lateral support structure is located to a side of the object. For example, the object and the lateral support structure are built in the same layers with the scan pattern in each layer including a portion of the object and a portion of the lateral support structure. The lateral support structure is separated from the object (e.g., by a portion of unmelted powder in each layer) or connected by a break-away support structure. Accordingly, the lateral support structure may be easily removed from the object during post-processing. In an aspect, the lateral support structure provides support against forces applied by the recoater when applying additional powder. Generally, the forces applied by the recoater are in the direction of movement of the recoater as it levels an additional layer of powder. Accordingly, the lateral support structure is built in the direction of movement of the recoater from the object. Moreover, the lateral support structure may be wider at the bottom than at the top. The wider bottom provides stability for the lateral support structure to resist any forces generated by the recoater.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method for fabricating an object, comprising:
 (a) irradiating a layer of powder in a powder bed with an energy beam in a series of scan lines to form a fused region;
 (b) providing a subsequent layer of powder over the powder bed by passing a recoater arm over the powder bed from a first side of the powder bed to a second side of the powder bed; and
 (c) repeating steps (a) and (b) until the object and at least one support structure are formed in the powder bed,
 wherein the energy beam has a first width when irradiating the powder forming the support structure,
 wherein the energy beam has a second width when irradiating the powder forming the object, the second width being different from the first width,
 wherein the at least one support structure includes a plurality of substantially parallel vertical walls, each wall extending substantially parallel to a direction from the first side to the second side;
 wherein adjacent walls of the plurality of substantially parallel vertical walls are separated by a continuous portion of unfused powder; and
 wherein the object is formed above the plurality of substantially parallel vertical walls.

2. The method of claim 1, further comprising:
setting the first width to be less than a distance between center lines of the adjacent walls when irradiating the powder forming the support structure.

3. The method of claim 2, further comprising:
setting a spacing between scan lines equal to the distance between center lines of the adjacent walls.

4. The method of claim 2, further comprising:
setting a constant orientation for the scan lines within the at least one support structure.

5. The method of claim 1, further comprising:
providing a three dimensional computer model of the object;
extruding, in a computer aided design program, the object downward to define the at least one support structure under the object; and
providing the model of the object and the at least one support structure to an additive manufacturing apparatus.

6. The method of claim 5, wherein the additive manufacturing apparatus includes a processor executing a control program that controls the additive manufacturing apparatus to perform steps (a), (b), and (c) according to the model.

7. The method of claim 1, further comprising:
providing a three dimensional computer model of the object;
adding, in a computer aided design program, a model of each of the plurality of substantially parallel vertical walls; and
providing the model of the object and the plurality of substantially parallel vertical walls to an additive manufacturing apparatus.

8. The method of claim 1, wherein a distance between center lines of the adjacent walls is at least 1 millimeter.

9. The method of claim 1, wherein a distance between center lines of the adjacent walls is between approximately 1 millimeter and approximately 10 millimeters.

10. The method of claim 1, wherein a width of each of the plurality of substantially parallel vertical walls is approximately 0.5 millimeters.

11. The method of claim 1, wherein an angle formed between the plurality of substantially parallel vertical walls and the direction from the first side to the second side is less than 10 degrees.

12. The method of claim 1, wherein an angle formed between the plurality of substantially parallel vertical walls and the direction from the first side to the second side is less than 5 degrees.

* * * * *